Nov. 12, 1957 H. J. ALTWICKER ET AL 2,812,572
METHOD OF SHAPING AND FINISHING HOLLOW ELONGATED OBJECTS
Filed July 17, 1951 2 Sheets-Sheet 2
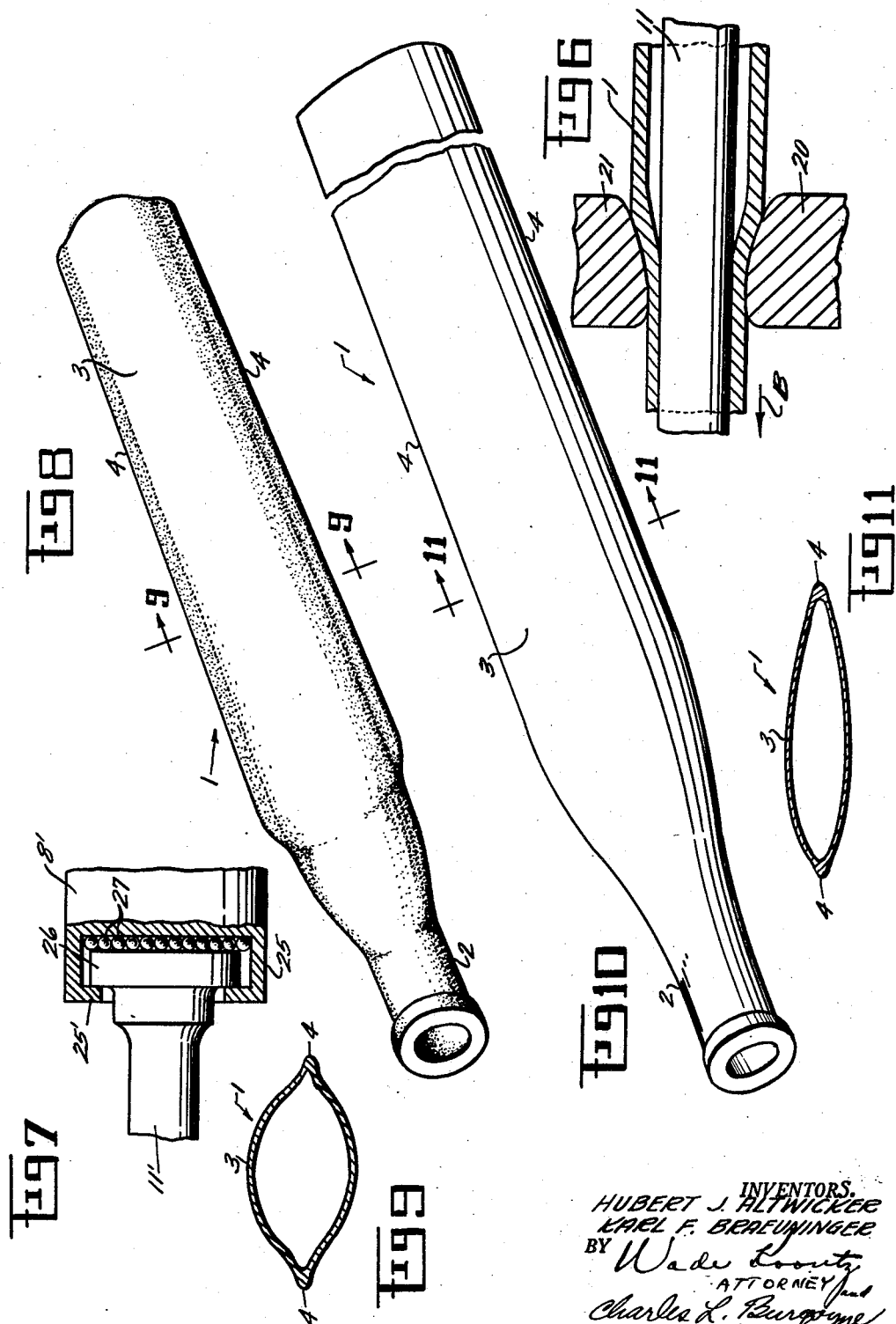
INVENTORS.
HUBERT J. ALTWICKER
KARL F. BRAEUNINGER
BY Wade Loouty
ATTORNEY
Charles L. Burgoyne
AGENT United States Patent Office 2,812,572
Patented Nov. 12, 1957

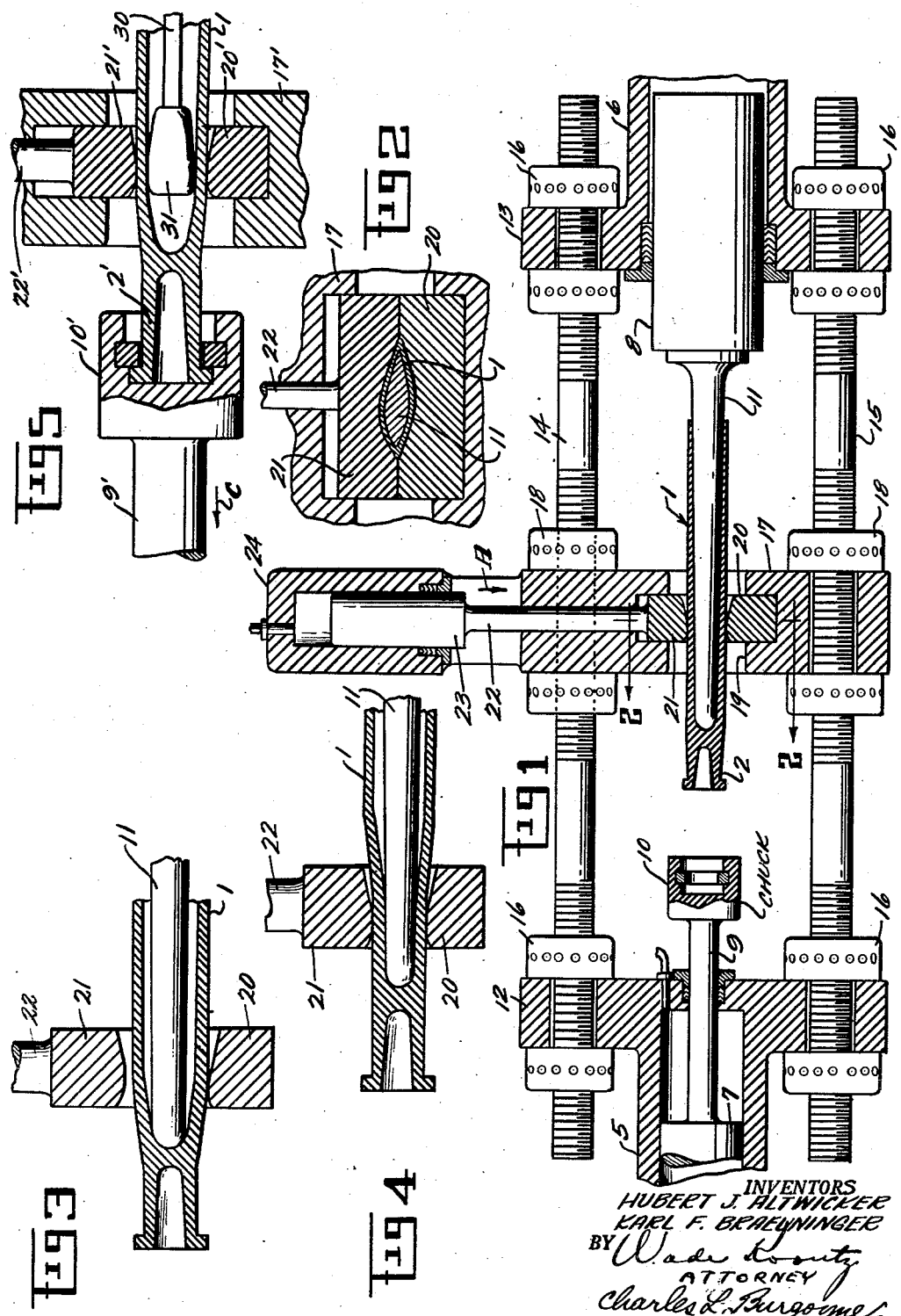

2,812,572
METHOD OF SHAPING AND FINISHING HOLLOW ELONGATED OBJECTS

Hubert J. Altwicker and Karl F. Braeuninger, Dayton, Ohio

Application July 17, 1951, Serial No. 237,276

3 Claims. (Cl. 29—156.8)

(Granted under Title 35, U. S. Code (1952), sec. 266)

The invention described herein may be manufactured and used by or for the United States Government for governmental purposes without payment to us of any royalty thereon.

The present invention relates to a method of shaping and finishing hollow elongated objects and particularly such objects made of metal.

The primary object of the invention is to provide a method of shaping and finishing hollow elongated objects by drawing the objects longitudinally and simultaneously exerting lateral pressure on the outside surfaces while maintaining a back-up mandrel within the hollow object, with the mandrel having a shape and contour desired in the completed hollow object.

A further object of the invention is to provide a method of shaping and finishing hollow elongated objects by drawing the objects longitudinally and simultaneously exerting lateral pressure on the outside surfaces by means of opposed surface engaging members movable toward each other by hydraulically actuated means to force the walls of the hollow objects into contact with a back-up mandrel positioned inside each hollow object and movable longitudinally with the hollow object.

Another object of the invention is to provide a method of shaping and finishing hollow elongated objects by drawing the objects longitudinally and simultaneously exerting lateral pressure on the outside surfaces while maintaining a back-up mandrel within the hollow object, which mandrel is movable longitudinally with the hollow object, and to further provide a finishing step comprising drawing the hollow object longitudinally and exerting lateral pressure on the outside surface by surface engaging members covering only a limited area at any time while simultaneously maintaining a surface engaging member inside the hollow object in stationary position opposite the surface engaging members.

The above and other objects of the invention will become apparent upon reading the following detailed description in conjunction with the accompanying drawings, in which:

Fig. 1 is a central longitudinal cross section of the apparatus used in practicing the present shaping and finishing method.

Fig. 2 is a transverse cross section taken on line 2—2 of Fig. 1.

Fig. 3 is a fragmentary longitudinal cross section showing the shaping tools about to engage the work piece.

Fig. 4 is a view similar to Fig. 3 but showing the initial phase of the shaping and finishing process.

Fig. 5 is a view similar to Fig. 4 but showing a subsequent operation wherein the walls of the hollow object are being given a final finish.

Fig. 6 is an enlarged longitudinal cross sectional view similar to Fig. 4 and illustrating the action of the shaping tools on the walls of the hollow object.

Fig. 7 is a detail cross sectional view to show a preferred manner of connecting the forming mandrel to the hydraulically actuated piston.

Fig. 8 is a perspective view of a typical hollow object, in this case a propeller blade blank, before the shaping and finishing process is applied thereto.

Fig. 9 is a transverse cross sectional view taken on line 9—9 of Fig. 8.

Fig. 10 is a perspective view of the propeller blade blank after the shaping and finishing process has been completed.

Fig. 11 is a transverse cross sectional view taken on line 11—11 of Fig. 10.

In our copending patent application Serial No. 221,496, filed on April 17, 1951, there is disclosed a method for producing hollow objects by extrusion of metals and the objects so produced have side walls of tapering thickness. In the present application a method will be disclosed for shaping and finishing the hollow objects and particularly for shaping the portions thereof bounded by the tapered side walls. For the purpose of explaining the preferred embodiment of the present method, the hollow objects will be propeller blade blanks but other analogous or similar hollow objects may be produced if desired. The blank 1 as it stands ready for shaping and finishing is shown in Fig. 8. The root end 2 which attaches to the propeller hub will be in finished form but the hollow main portion 3 extending toward the tip end will be too thick in one transverse dimension and not thick enough in the dimension at right angles thereto. Thus considering Fig. 9 it will be seen that the semi-finished blank is too thick in the vertical direction but not wide enough in the horizontal direction. Therefore the blade blank must be flattened and also contoured as required in the finished blade. A good surface finish will also be required. Of course if Fig. 9 is considered it will be obvious that flattening the blank in the vertical direction will cause a proportionate increase in the horizontal direction or width of the blank. The cross sectional contour in the unfinished state is such that there are opposite edge flanges or beads 4 and after shaping the blank by the present method the surface of these beads will blend into the opposite side walls, since flattening of the side walls will bring them more nearly into line with the adjacent surfaces of the edge flanges 4.

A schematic arrangement of the flattening and shaping apparatus is shown in Fig. 1. This apparatus is essentially a drawing press including a frame for support of a pair of coaxial hydraulic cylinders 5 and 6, within which are slidably mounted hydraulically actuated pistons 7 and 8 respectively. The piston rod 9 on the piston 7 extends from the cylinder 5 to connect with a chuck or work gripper 10 within which the root end 2 of the propeller blank 1 can be retained. The piston rod 11 on the piston 8 extends toward the chuck 10 and serves as a mandrel to carry the blank 1. Furthermore the mandrel is shaped and contoured to conform to the desired internal shape of the finished propeller blank. Thus in Fig. 1 the mandrel is seen from the side of its narrowest dimension and in a direction at right angles thereto will be much wider (see Fig. 2).

The hydraulic cylinders 5 and 6 carry oppositely extending supporting elements 12 and 13 arranged in pairs to receive the longitudinal support rods 14 and 15, threaded at opposite ends to receive the clamping nuts 16. Intermediate of their length the rods are threaded to receive a transverse supporting frame 17 adjustably positioned by means of clamping nuts 18. The frame 17 is open through the central part at 19 to allow free passage of the propeller blank 1 and rod or mandrel 11. At one side of the blank is mounted a shaping anvil or shoe 20 in relatively stationary position and directly opposite thereto is a slidably mounted shaping anvil or shoe 21 having a piston rod 22 thereon. The piston rod 22 is integrally connected to a piston 23 extending into a hydraulic cylinder 24. Force may thus be applied to force the shaping anvil 21 into contact with the blank 1 and also force the blank into contact with the other shaping anvil 20. The arrow A indicates the direction of the applied force. Since the mandrel 11 may tend to be displaced laterally during shaping and finishing of the blank 1, it may be desirable to mount the mandrel as shown in Fig. 7. In this view it will be seen that a piston 8' includes a circular chamber or recess 25 to receive a disk-like head portion 26 on the mandrel 11'. Edge flange 25' on the piston prevents the head portion 26 from falling out of the recess 25 but permits limited sidewise movement thereof. A multiplicity of anti-friction ball elements 27 between the head portion 26 and the piston 8' reduce the friction and permit free lateral movement of the mandrel under the influence of the transversely movable shaping anvil 21. Lubrication in the recess 25 also helps to permit limited sidewise movement of the head portion 26 on the mandrel 11.

The present shaping and finishing method is applied to a propeller blank as shown in Fig. 8, in order to flatten the blank throughout the length of the hollow or tubular main portion thereof and also to reduce the wall thickness to some extent, say about 20 percent. The process in its preferred form is carried out at room temperature, since cold working of the metal making up the blank will result in an appreciable increase in strength and hardness. The hollow blank 1 of Fig. 8 is applied over the mandrel 11 with the mandrel retracted as far as possible. In order to force the blank over the mandrel to the full extent as shown, the chuck 10 may be actuated to apply endwise thrust on the root end 2 of the blank. By this means the blank may be made wider and flatter than it was originally, with the mandrel in supporting relation to the blank walls at the inside surface thereof. This is especially necessary at the opposite longitudinal narrowed-down portions of the blank where subsequent operations will tend to cause wrinkling or deformation of the walls of the blank. After the mandrel 11 is in the fully interfitted position with respect to the hollow tubular blank 1, the chuck 10 is engaged with the root end portion 2 of the blank. The actual forming and shaping process is started with the forming shoes 20 and 21 adjacent to the root end of the blank. The pistons 7 and 8 are now actuated by flow of hydraulic fluid into the cylinders 5 and 6 to cause movement of the pistons toward the left in Fig. 1, and at the same time the piston 23 is moved in the direction of arrow A to apply substantial lateral force on the outside surface of the blank through the agency of shaping or forming anvils 20 and 21. The start of this shaping process is shown in Fig. 4. The walls of the hollow section of the blank 1 are not only forced tightly into engagement with the mandrel 11 in order to conform to the shape thereof but the anvils 20 and 21 actually extrude the wall material somewhat to make them slightly thinner. This limited plastic flow occurs in the direction of the length of the blank to maintain the longitudinal orientation of the grain structure, particularly in the case of blanks originally formed by extrusion of a preheated billet in the manner disclosed in our copending application identified above. In a propeller blade this longitudinal arrangement of the grain structure lends strength to the blade in the direction of the length, which is highly desirable because of the centrifugal force developed on rotation of the propeller. The cold working of the metal during the present shaping and finishing method results in an appreciable increase in the ultimate strength of the material.

Considering Fig. 6 of the drawings the action of the shaping members 20 and 21 is shown in enlarged cross section. Here the mandrel 11 and blank 1 are being moved in the direction of the arrow B. The members 20 and 21 have a contour on their opposed faces corresponding to the desired outer contour of the propeller blank and roughly similar to the cross sectional contour of the mandrel 11. As the mandrel and blank are moved to the left, the lateral force exerted by the shaping members 20 and 21 on the blank wall not only forces the wall into contour conforming contact with the mandrel but causes also a limited surface extrusion of the material and some longitudinal drawing and stretching of the wall material. The unshaped walls are seen to the right of the members 20 and 21 and the shaped and attenuated walls are seen to the left of the members 20 and 21 after having been exposed to the high lateral forces exerted by the members. As seen in Fig. 6 the working surfaces of the members 20 and 21 form a relatively large opening to receive the moving blank and these surfaces converge gradually to cause a progressive shaping and attenuating of the blank walls. The walls after shaping and finishing may be reduced in thickness about 20 percent to achieve an appreciable strengthening effect on the metal walls. After the shaping of the walls is completed, the propeller blank is relatively wide and flattened as shown in Fig. 10 but the inner or root end is not affected. If the working surfaces of the members 20 and 21 are maintained highly polished, the outer surfaces of the completed blank will be smooth over most of the area.

In some cases it may be desirable to improve the surface characteristics of the blank by further cold working with highly polished forming tools. Referring to Fig. 5 it will be seen that a blank 1, which has been shaped by the previously described method, is about to be subjected to a surface treatment to achieve greater smoothness on the inside and outside of the tubular blank. The root portion 2' of the blank is maintained in the hollow chuck 10' by any conventional means and by the action of the piston rod 9' the blank is pulled in the direction of arrow C. At the same time a surface finishing tool 30 is maintained inside the blank in relatively fixed position. An enlarged end portion 31 on the tool comprises a hardened steel body having a polished surface adapted to impart an improved surface finish to the inside of the blank during the final cold working step. Similarly the surface engaging members 20' and 21' mounted in the frame 17' are provided with a polished surface to improve the surface finish on the outside of the blank. The member 21' is actuated by a hydraulic actuator through the piston rod 22', as in Fig. 1. Thus the lateral pressure is maintained on the surface engaging members 20', 21' and 31 at the same time the blank is moved to the left. There results therefrom a shallow cold working of the metal and this ironing step gives a superior surface smoothness to the metal besides the improvement in strength due to cold working of the metal. Elimination of surface irregularities is important in that cracks are more likely to start where irregularities are present, due of course to higher concentration of stresses around hollows, grooves or depressions. It is noted that there may be slight longitudinal fins or projections formed on the outside of the blank at the parting line between the opposed surface engaging members 20' and 21' but these may be ground or polished off later.

The shaping and finishing process as described above is characterized by the application of laterally applied pressure on the surface of elongated hollow objects at the same time the objects are moved slowly in a longitudinal direction. The resulting surface extrusion or cold working not only improves the surface finish but produces an attenuation of the walls according to the amount of lateral pressure applied. The walls are also elongated in direct proportion to the amount of attenuation thereof, so that the resulting blank is slightly longer than before the process is begun. The application of lateral pressure at the same time a back-up mandrel is present inside the blank also results in a reliable wall shaping action, as the walls are forced inwardly against the back-up mandrel. In some cases the final wall smoothing action obtained by the final step of Fig. 5 may be omitted where the surface finish is not critical or in case another type of surface finishing is desired. The shaping and finishing process is accomplished without preheating the blank or other hollow object and the resulting cold working of the metal increases its ultimate strength very appreciably. It may be necessary to anneal the blank after the shaping and finshing thereof in order to relieve internal stresses in the metal. After annealing the final surface finishing may be accomplished in the manner shown in Fig. 5. Even though the walls are made thinner by the process, their net strength is not reduced because the cold working increases the ultimate strength per unit of cross sectional area.

The embodiments of the invention herein shown and described are to be regarded as illustrative only and it is to be understood that the invention is susceptible of variations, modifications and changes within the scope of the appended claims.

We claim:

1. The method of shaping and finishing a hollow elongated metal propeller blank having a flanged root end portion and having a hollow blade portion formed with an internal longitudinal taper from the root end to the tip end with a pair of longitudinally-extending diametrically-opposite ribs thereon at the leading and trailing edges of the propeller blank comprising, mounting the hollow blank on a tapered mandrel extending longitudinally inside of the blank from one end with the mandrel having a shape and size corresponding to the desired inside tapered shape of the inside of the blank, engaging the other end of the propeller blank with a controllable chuck means, progressively exerting lateral pressure on the outside surface of the blank from the root end to the tip end by means of two opposed controllable shaping anvils movable relative to each other against the opposite exterior surfaces of the blade between the ribs, said anvils having a shape on their blank engaging surfaces conjointly corresponding to the desired outside shape of the blank with the parting lines of said anvils located at said pair of longitudinally-extending ribs, and simultaneously relatively moving said tapered mandrel with the hollow blank thereon longitudinally between said two opposed shaping anvils while maintaining a controlled pressure on the anvils to cause the same to engage the outer wall of the blank to produce combined wall shaping and outer surface extrusion of the tapered wall portion of the blank.

2. The method of shaping and finishing a hollow elongated metal propeller blank having a flanged root end portion and having a hollow blade portion internally tapered from the root end portion to the tip end portion with a pair of longitudinally-extending diametrically-opposite ribs thereon at the exterior leading and trailing edges of the propeller blank comprising, mounting the hollow blank on a tapered mandrel extending longitudinally inside the blank from one end with the exterior of the mandrel having a tapered shape and size corresponding to the desired inside shape and size of the blank, exerting lateral pressure on the outside surface of the blank between said ribs by means of two opposed controllable shaping anvils movable relative to each other, said anvils having a shape on their blank engaging surfaces conjointly corresponding to the desired outside shape of the finished blank with the parting lines of said anvils located at said pair of longitudinally-extending ribs, while moving said mandrel longitudinally by force acting on one end thereof outside of the hollow blank at the end remote from the root end portion of the blank, and simultaneously drawing said hollow blank in the same direction as said mandrel by means acting on the root end portion of the blank.

3. The method of shaping and finishing a hollow elongated tapered wall propeller blank having a closed root end portion and having a hollow blade portion tapering internally from the root portion to the tip end portion and a non-tapered exterior surface with a pair of longitudinally-extending diametrically-opposite ribs on the outside comprising, mounting the hollow internally tapered blank on a tapered mandrel extending longitudinally inside the blank with the free end of the mandrel abutting the closed root end portion of the blank and tapering toward the free end portion and with the mandrel having a tapered outer shape and size corresponding to the desired inside tapered shape of the blank, exerting lateral pressure on the outside surface of the blank by means of two opposed shaping anvils movable toward each other, said anvils having a shape on their blank engaging surfaces conjointly corresponding to the desired outside surface of the finished blank with the parting lines of said anvils located at said pair of longitudinally-extending ribs, moving said tapered mandrel longitudinally by force acting in compression thereon and applied at the end remote from said free end, simultaneously moving said hollow internally tapered blank in the same direction as the mandrel by a tractive force applied at the root end portion of the blank while maintaining said pressure on said opposed shaping anvils, whereby the tapered walls of said blank are partially flattened between said longitudinally-extending ribs and are reduced in thickness while being simultaneously elongated in the longitudinal direction with the wall thickness thereof tapering from the root end to the tip end of the propeller blank.

References Cited in the file of this patent

UNITED STATES PATENTS

| | | |
|---|---|---|
| 252,423 | Buckingham | Jan. 17, 1882 |
| 440,130 | Bray | Nov. 11, 1890 |
| 880,563 | McTear | Mar. 3, 1908 |
| 1,711,825 | Barnhart | May 7, 1929 |
| 2,091,001 | Kobberup et al. | Aug. 24, 1937 |
| 2,485,534 | Mayne et al. | Oct. 18, 1949 |
| 2,658,265 | Brauchler et al. | Nov. 10, 1953 |

FOREIGN PATENTS

| | | |
|---|---|---|
| 346,455 | Germany | June 3, 1920 |